(12) United States Patent
Iten

(10) Patent No.: US 7,147,457 B2
(45) Date of Patent: Dec. 12, 2006

(54) INJECTION DEVICE USED FOR BLOW MOLDING HOLLOW PLASTIC BODIES, COMPRISING EXTRUSION MANDRELS THAT CAN BE TEMPERED AND ARE INSERTED INTO EXTRUSION MANDREL FASTENER

(75) Inventor: Beat Iten, Schleitheim (CH)

(73) Assignee: Polymold AG (CH)

( * ) Notice: Subject to any disclaimer, the term of this patent is extended or adjusted under 35 U.S.C. 154(b) by 0 days.

(21) Appl. No.: 10/527,362

(22) PCT Filed: Sep. 1, 2003

(86) PCT No.: PCT/CH03/00593

§ 371 (c)(1),
(2), (4) Date: Mar. 10, 2005

(87) PCT Pub. No.: WO2004/024418

PCT Pub. Date: Mar. 25, 2004

(65) Prior Publication Data

US 2006/0013909 A1    Jan. 19, 2006

(30) Foreign Application Priority Data

Sep. 13, 2002  (CH) .................................... 1560/02

(51) Int. Cl.
  B29C 45/73  (2006.01)
  B29C 49/06  (2006.01)
  B29C 49/64  (2006.01)

(52) U.S. Cl. ........................ 425/547; 425/528; 425/534

(58) Field of Classification Search ................ 425/528, 425/529, 534, 539, 547
See application file for complete search history.

(56) References Cited

U.S. PATENT DOCUMENTS 3,196,198 A    7/1965 Rex 3,690,802 A    9/1972 Fischer
4,054,629 A    10/1977 Wang (Continued)

FOREIGN PATENT DOCUMENTS

| DE | 1 944 918   | 3/1970 |
| DE | 25 17 186   | 10/1976 |
| EP | 0 700 770 A2 | 3/1996 |

(Continued)

*Primary Examiner*—Joseph S. Del Sole
*Assistant Examiner*—Emmanuel S. Luk
(74) *Attorney, Agent, or Firm*—George Pappas

(57) ABSTRACT

Disclosed is an extrusion mandrel fastener (2) that is embodied as a two-piece unit comprising a supporting beam (4) and a holding beam (5) which can be joined together and are provided with semi-cylindrical recesses (7, 8) complementing each other so as to form cylindrical recesses (9). An extrusion mandrel (3) is inserted into each cylindrical recess (9) and is retained therein. The extrusion mandrel fastener (2) and the extrusion mandrels (3) are provided with ducts (13, 14, 15, 16, 24, 25) which allow fluid circulation so as to temper the extrusion mandrels (3) and communicate with each other as well as with openings (11, 26) that are disposed on the extrusion mandrel fastener (2) via cylindrical connecting sleeves (30). Said connecting sleeves (30) are preferably sealed by means of sealing rings and fix the extrusion mandrel (3) to the extrusion mandrel fastener (2). Preferably, the holding beam (4) is configured as a two-piece element comprising an extrusion mandrel connection beam (17) and a fluid connection beam (18) which can be joined together and are provided with ducts (13, 14, 15, 24, 25). Said ducts (13, 14, 15, 24, 25) communicate with each other so as to allow fluid circulation between the openings (11, 26) and through the extrusion mandrels (3) or the ducts (16) that are disposed therein. Preferably, the fluid connection beam (18) is embodied as a two-piece member comprising a body (19) and a lid (20) which can be joined together, the ducts (24, 25) being configured as grooves that are mounted on the body (19) of the fluid connection beam (18) and are covered by the lid (20).

7 Claims, 5 Drawing Sheets

U.S. PATENT DOCUMENTS

| | | |
|---|---|---|
| 4,275,864 A | 6/1981 | Richards |
| 4,412,806 A | 11/1983 | Gaiser et al. |
| 4,655,280 A | 4/1987 | Takahashi |
| 5,403,177 A | 4/1995 | Priest |
| 5,631,030 A | 5/1997 | Brun, Jr. et al. |
| 6,095,788 A * | 8/2000 | van Manen et al. ........ 425/526 |
| 2002/0101010 A1 | 8/2002 | Vailliencourt |

FOREIGN PATENT DOCUMENTS

| | | |
|---|---|---|
| EP | 0 937 566 A1 | 8/1999 |
| EP | 1 048 435 A1 | 11/2000 |
| JP | 08281713 | 10/1996 |
| JP | 09327760 | 12/1997 |
| WO | WO 0029193 | 5/2000 |

* cited by examiner

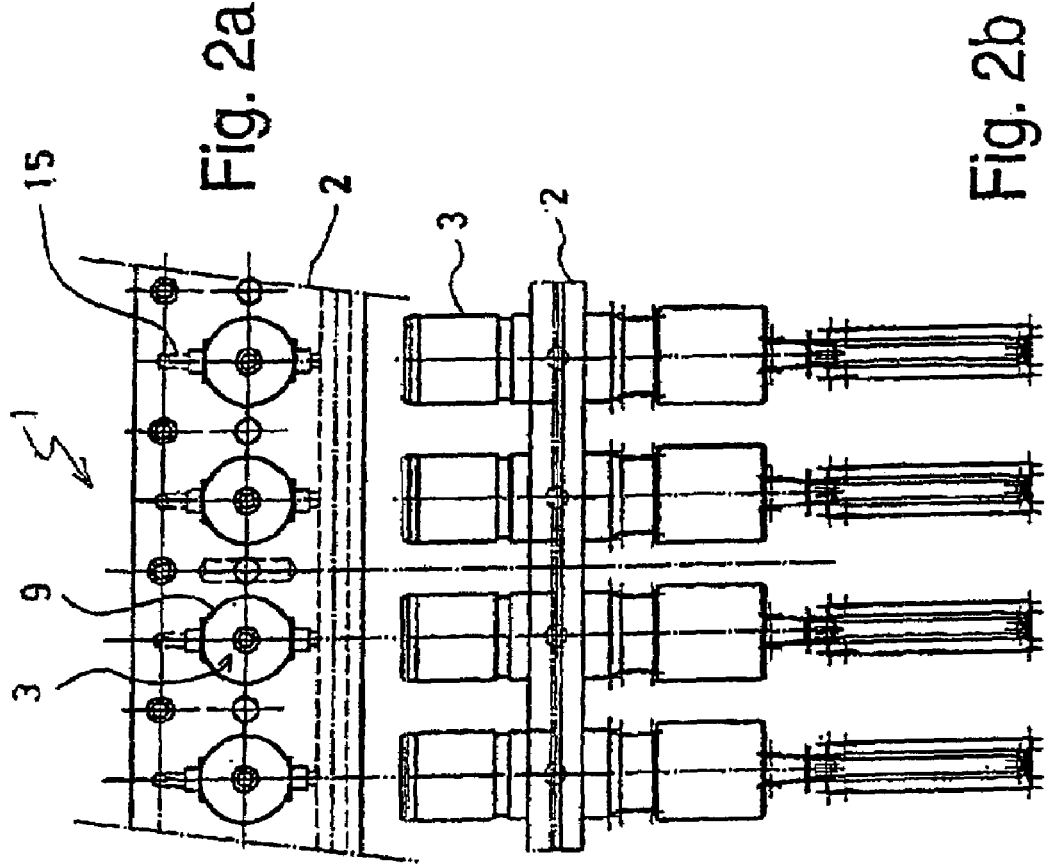
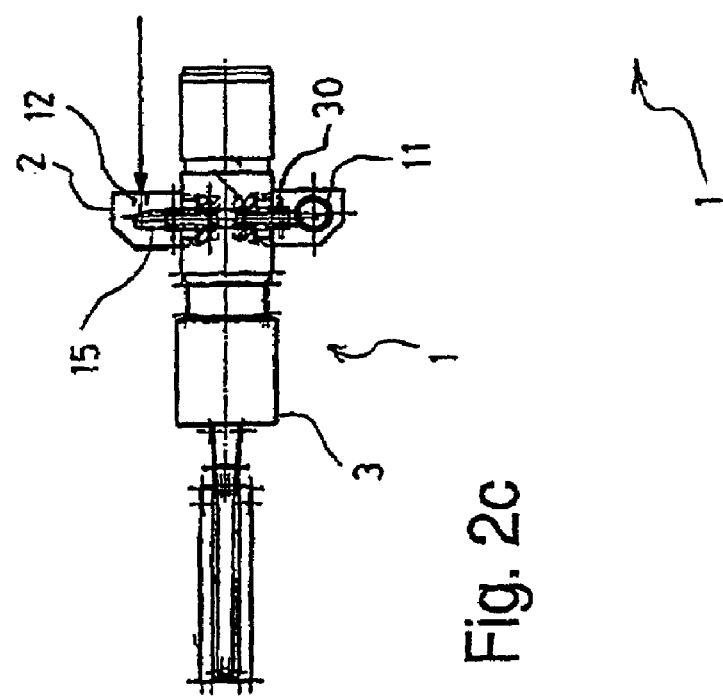

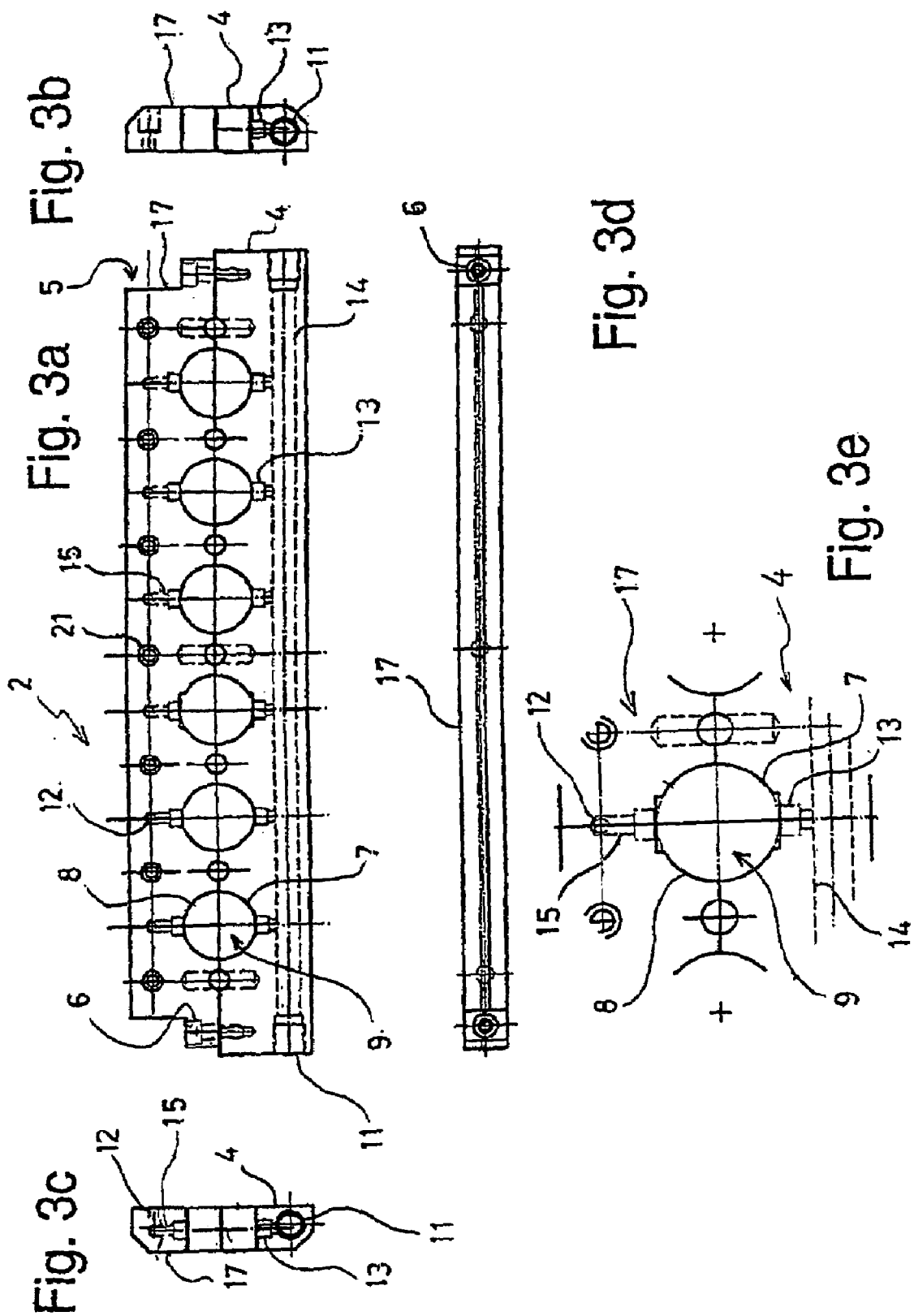

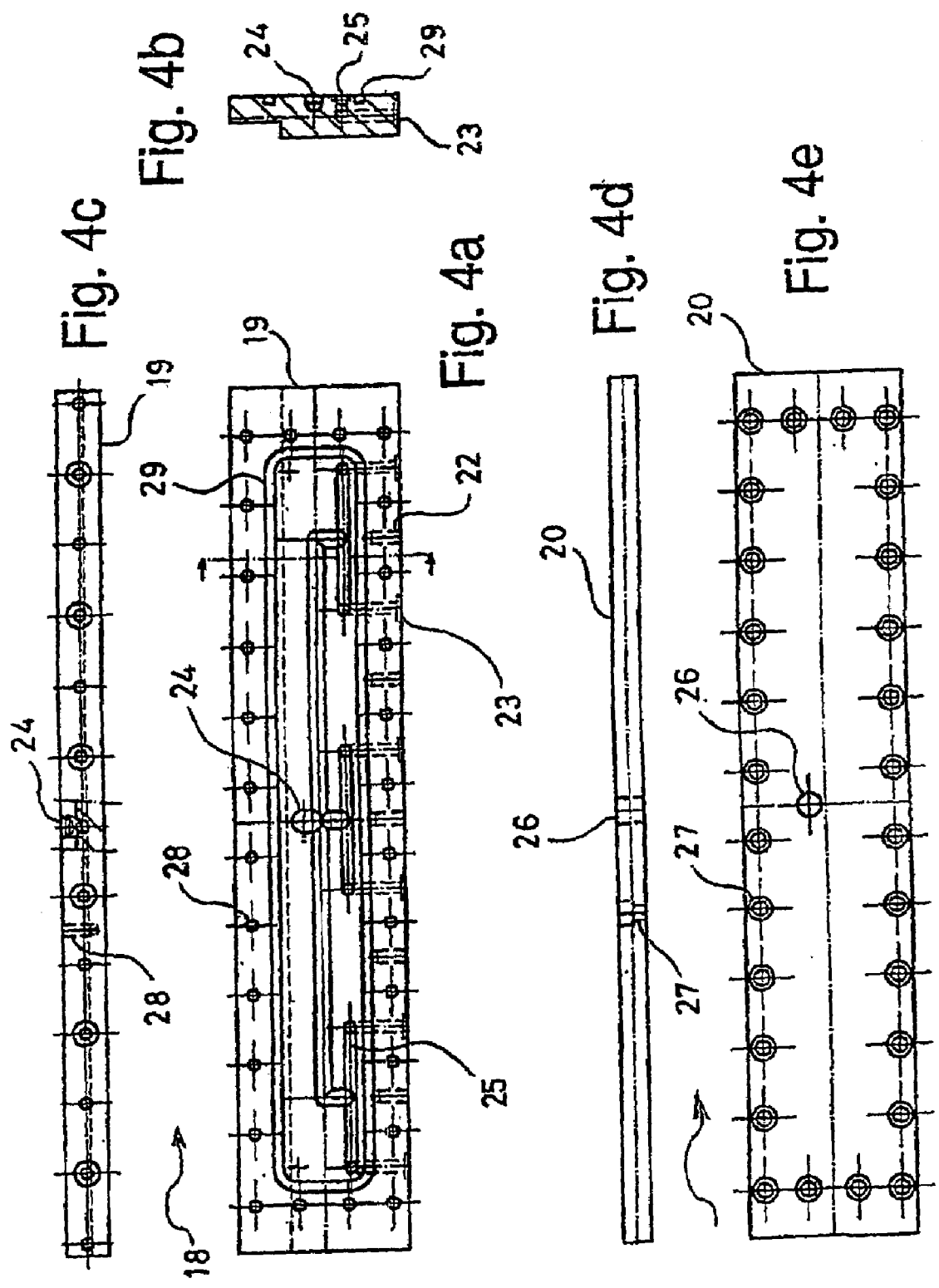

INJECTION DEVICE USED FOR BLOW MOLDING HOLLOW PLASTIC BODIES, COMPRISING EXTRUSION MANDRELS THAT CAN BE TEMPERED AND ARE INSERTED INTO EXTRUSION MANDREL FASTENER

This application claims priority of PCT application PCT/CH2003/000593 having a filing date of Sep. 1, 2003 the disclosure of which is hereby incorporated herein by reference.

TECHNICAL FIELD

The present invention relates to an injection device used for example for blow molding hollow plastic bodies, and in particular pharmaceutical containers, comprising temperature-controllable blowing mandrels inserted in a blowing mandrel holder.

PRIOR ART

In the blow molding of hollow plastic bodies (as known for example from EP-1048435-A1), the blowing mandrels used for this purpose must be kept at an optimum temperature for the technical requirements of the process. After starting the system, an equilibrium is established for each blowing mandrel between the heat supplied by the plastic injected onto the blowing mandrel and the heat dissipated by the cooling effect of the ambient air on the blowing mandrel. However, the temperature that is suitable for blow molding only establishes itself of its own accord under suitable conditions, and even then this is not reliably achieved, since it is not ensured that the temperature of the blowing mandrels will always remain at the right temperature because of the lack of any possibility of intervention, and it is only evident that the temperature is deviating from the suitable value when difficulties occur. EP-1048435-A1 does not address this temperature problem at all.

To remedy this temperature problem, in the prior art (for example as known from DE-1944918-A1) it is provided that the temperature that establishes itself of its own accord is higher than the temperature value that is suitable for blow molding and the blowing mandrel is cooled to the suitable temperature by blowing air onto it from the outside and/or with the aid of a cooling circuit provided inside the blowing mandrel, it being possible in the latter case for the temperature-control medium circulating in the cooling circuit to be air or liquid and, depending on the temperature conditions, for the latter to be oil or else water, for example. A disadvantage of these measures is that the temperature-control medium has to be supplied to each blowing mandrel and, in this case, a flow and a return of the temperature-control medium has to be provided for each blowing mandrel in the form of flexible lines and/or fixedly screwed or soldered pipes. In the case of an injection device with a multiplicity of blowing mandrels, a double multiplicity of lines of temperature-control medium is required as a result at the blowing mandrels, that is in each case a flow and a return of the temperature-control medium for each blowing mandrel, which entails disadvantages: such a design is susceptible to faults and requires considerable maintenance, and it also leads to long resetting times every time blowing mandrels are exchanged.

To remedy the last-mentioned disadvantages, the prior art (for example as known from WO-00/29193-A1 or EP-0937566-A1) proposes designs in which only two lines of the temperature-control medium are required for controlling the temperature of a multiplicity of blowing mandrels, in that a number of blowing mandrels are respectively inserted in a common holder and the latter only requires one flow and one return of the temperature-control medium. It is disadvantageous in this case that, to fasten a blowing mandrel in its holder, a positive and nonpositive connection has to be brought about between a holding region of the blowing mandrel and a matching recess of the holder and the blowing mandrels nevertheless have to be easily exchangeable, i.e. easy to release from the holder and easy to fasten to it. Furthermore, it must be taken into account that the blowing mandrels undergo jerky movements back and forth in the longitudinal direction during the operation of the device and are thereby subjected to strong accelerations, and consequently strong forces, in the longitudinal direction, so that they tend to slip in their holders: because of this stress to which the exchangeable blowing mandrels are subjected in their holders, it is difficult to ensure that they remain positioned in their holders with the necessary precision. Previous holders of exchangeable blowing mandrels have been susceptible to faults and/or required considerable maintenance and led to long resetting times every time blowing mandrels are exchanged.

The forming of a blowing mandrel with a flow and return of a temperature control medium is known for example from DE 2517186-A1 or U.S. Pat. No. 4,655,280-A1. The blowing mandrel is essentially formed as a blind tube with a dividing wall inserted in it diametrically in its axial longitudinal direction. Formed in the interior of the blowing mandrel, and in its axial longitudinal direction, are two elongate chambers, which are connected at their one end (in the vicinity of the free end of the blowing mandrel) to each other via a clearance in the dividing wall and are connected at the other end (at the holder of the blowing mandrel) to the flow or return of the temperature control medium via their respective connecting piece in the form of a cylindrical sleeve. The connecting piece is in the form of selectable sleeves serve the purpose of respectively connecting a flow line and a return line for the tempter control medium to the blowing mandrel, in order that a circulation of the 20 control medium can be established within the blowing mandrel. With respect to these connecting piece is in the form of cylindrical sleeves, no other purpose and no other function is disclosed in DE 2517186-A1 and U.S. Pat. No. 4,655,280-A1, and the forming of an injection device comprising a number of temperature-controllable blowing mandrels inserted in a blowing mandrel holder is not dealt with in DE 2517186-A1 and U.S. Pat. No. 4,655,280-A1.

SUMMARY OF THE INVENTION

The object of the invention is accordingly to propose an injection device of the type stated at the beginning in which the blowing mandrels remain positioned in their holders with the necessary precision in spite of the stress to which they are subjected in the longitudinal direction, and nevertheless can be exchanged in their holders with little effort.

Advantageous embodiments of the invention are described below.

What is advantageous about some embodiments of the invention is the fixing of the blowing mandrels in their holders by the connecting pieces. This measure has the effect that the blowing mandrels cannot slip, i.e. they remain positioned in their holders with the necessary precision in the longitudinal direction, although they can be exchanged in their holders with little effort.

What is also advantageous about some embodiments of the invention is the reduction in the effort required for producing the entire injection tool with its multiplicity of blowing mandrel holders, each with a multiplicity of blowing mandrels inserted in it. The fixing of the blowing mandrels in their holders by the connecting pieces has the effect that, although there is a positive connection between each holding region of a blowing mandrel and the matching recess of the holder, no significant nonpositive connection has to be brought about, which for its part facilitates the exchange of a blowing mandrel (fitting and removal) and consequently reduces the amount of time necessary for this.

What is also advantageous furthermore about some embodiments of the invention is that each blowing mandrel holder requires only two lines, that is only one flow and one return of the temperature-control medium, while the multiplicity of blowing mandrels inserted in a single blowing mandrel holder receive the temperature-control medium via plug-in connections which do not take up any space outside the blowing mandrel holder. This measure reduces the effort involved in handling the flow and return lines and the space requirement around the blowing mandrel holders, and consequently around the entire injection tool, which for its part facilitates the exchange of an entire injection tool and consequently reduces the amount of time necessary for this. This measure also leads to better uniformity of the temperatures at the various blowing mandrels.

BRIEF DESCRIPTION OF THE DRAWINGS

Exemplary embodiments of the invention are described in more detail below on the basis of the drawings, parts that are the same as one another being designated by the same reference numerals in all the figures, of which:

FIG. 2a shows a detail of the same injection device as in FIG. 1, in a view from the front;

FIG. 2b shows a detail of the same injection device as in FIG. 1, corresponding to the same detail as in FIG. 2a, in a view from above;

FIG. 2c shows the same injection device as in FIG. 1, but with the blowing mandrel in side view from the right and the blowing mandrel holder in cross section;

FIG. 3a shows, fitted together, a supporting bar and a blowing mandrel connecting bar of the same blowing mandrel holder as in FIG. 1, in a view from the front;

FIG. 3b shows the same supporting bars and blowing mandrel connecting bars as in FIG. 3a, in side view from the left;

FIG. 3c shows the same supporting bars and blowing mandrel connecting bars as in FIG. 3a, in side view from the right;

FIG. 3d shows the same supporting bars and blowing mandrel connecting bars as in FIG. 3a, in a view from above;

FIG. 3e shows an enlarged part of the view from the front shown in FIG. 1;

FIG. 4a shows a body of a fluid connecting bar of the same blowing mandrel holder as in FIG. 1, in a view from the front;

FIG. 4b shows the same body of the fluid connecting bar as in FIG. 4a, in side view from the left;

FIG. 4c shows the same body of the fluid connecting bar as in FIG. 4a, in a view from below;

FIG. 4d shows a cover of the fluid connecting bar of the same blowing mandrel holder as in FIG. 1, in a view from below;

FIG. 4e shows the cover of the fluid connecting bar of the same blowing mandrel holder as in FIG. 1, in a view from the front;

WAYS OF IMPLEMENTING THE INVENTION

Figure 1:
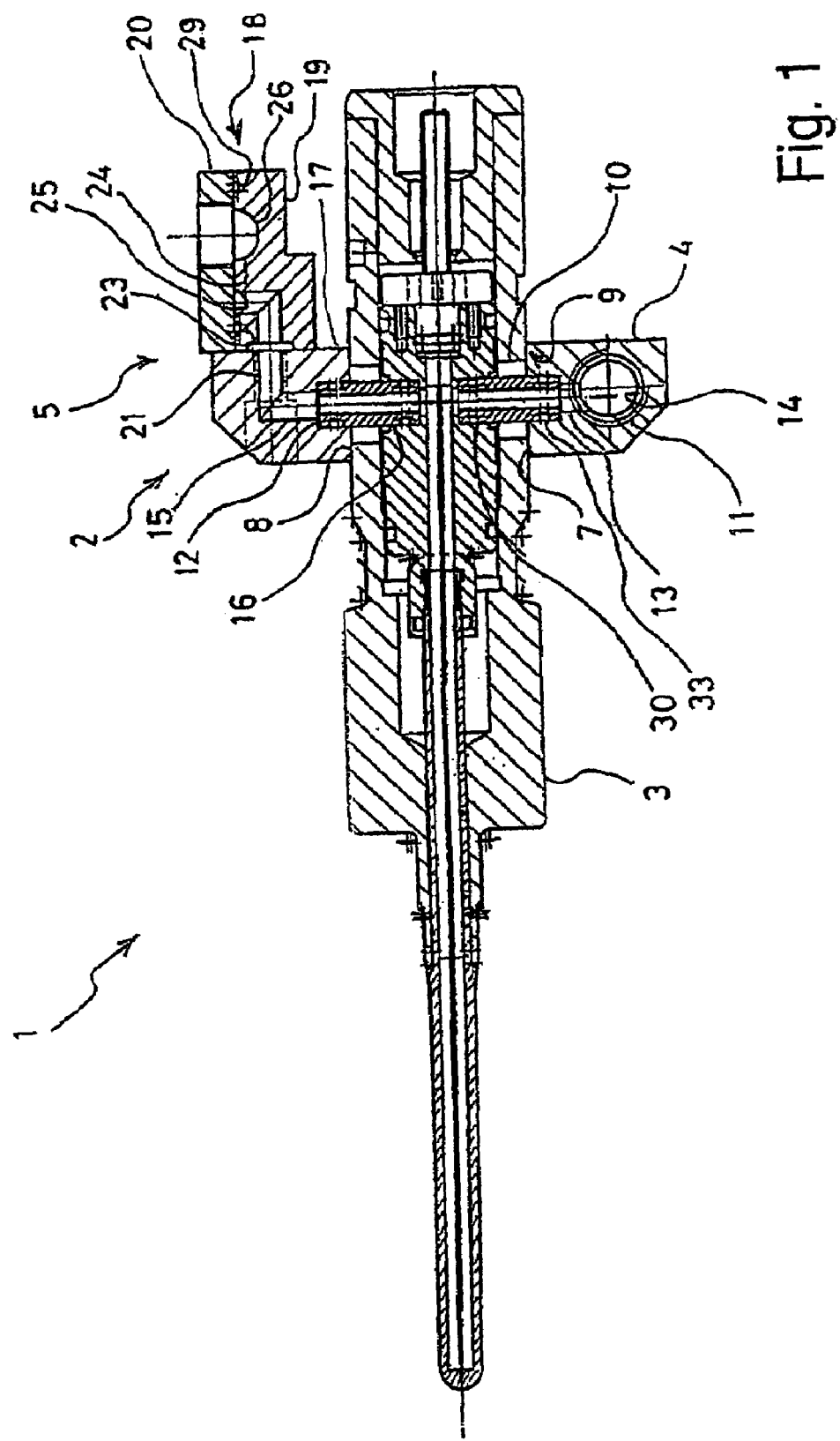
FIG. 1 shows a view of an injection device according to the invention in the fitted-together state, with blowing mandrels inserted in a blowing mandrel holder, as a whole in section with the blowing mandrel represented in axial longitudinal section.

The injection device shown in FIG. 1, designated as a whole by 1, is to be understood as part of an injection tool and comprises a blowing mandrel holder, designated as a whole by 2, and a number of blowing mandrels 3 (in the case of the embodiment represented in FIG. 3a as an example of the invention, six blowing mandrels are provided). The blowing mandrel holder 2 is made up of two parts and comprises a supporting bar 4 and a holding bar, designated as a whole by 5, which can be joined to each other, can be fastened on each other by means of screws 6 and can be released from each other by loosening and removing these screws 6.

The holding bar 5 is itself made up of two parts and comprises a blowing mandrel connecting bar 17 (cf. in FIGS. 3a to 3d) and a fluid connecting bar, designated as a whole by 18. This fluid connecting bar 18 is itself made up of two parts and has a body 19 and a cover 20 (cf. in FIGS. 4a to 4e). Consequently, when they are respectively fitted together, the body 19 and the cover 20 produce the fluid connecting bar 18, the fluid connecting bar 18 and the blowing mandrel connecting bar 17 produce the holding bar 5, and the holding bar 5 and the supporting bar 4 produce the blowing mandrel holder 2.

Figure 5:
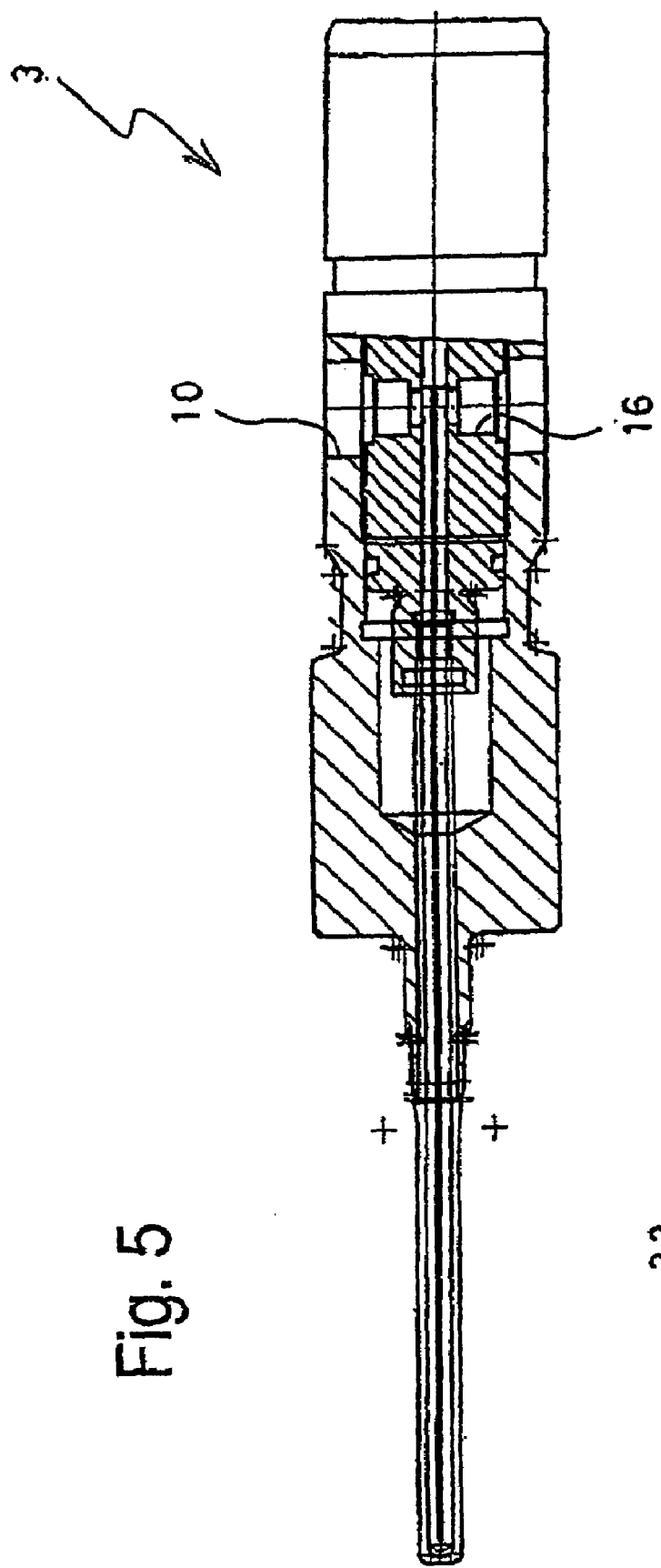
FIG. 5 shows an identical blowing mandrel as in FIG. 1, in axial longitudinal section.

The supporting bar 4 and the blowing mandrel connecting bar 17 both have an identical number of half-cylindrical recesses 7 and 8, respectively, corresponding to the number of blowing mandrels 3 (that is six recesses 7 and 8 in the case of the embodiment represented in the figures). With the supporting bar 4 and blowing mandrel connecting bar 17 fastened on each other, the half-cylindrical recesses 7 and 8 lie opposite one another in pairs, complementing one another in pairs to form cylindrical recesses of the blowing mandrel holder 2 designated as a whole by 9 (cf. in FIGS. 3a and 3e). In each cylindrical recess 9 there is a blowing mandrel 3 (cf. in FIGS. 2a to 2c), which can be inserted into the cylindrical recess 9 when the supporting bar 4 and the blowing mandrel connecting bar 17 are released from each other and is fixedly held therein by a positive connection when the supporting bar 4 and the blowing mandrel connecting bar 17 are joined together, the positive connection being produced between the cylindrical recess 9 and a corresponding groove 10 provided on the blowing mandrel 3 (cf. in FIG. 5).

The supporting bar 4, the blowing mandrel connecting bar 17 and the blowing mandrels 3 have channels, which are described in more detail further below. In the joined-together injection device 1, i.e. with the supporting bar 4 and the blowing mandrel connecting bar 17 fastened on each other and the blowing mandrels 3 inserted into the cylindrical recesses 9, these channels communicate with one another: they thereby form a system of channels, which makes a fluid circulation possible between an opening 11, provided on the supporting bar 4, and an opening 12, provided on the blowing mandrel connecting bar 17, for controlling the temperature of the blowing mandrels 3.

In connection with every blowing mandrel 3, the supporting bar 4 is provided with a respective channel 13, which connects the cylindrical recess 9 to a collecting channel 14 which is provided in the supporting bar 4 and for its part ends at the opening 11, so that a fluid can be conducted from the cylindrical recess 9 to the opening 11. Likewise in connection with every blowing mandrel 3, the blowing mandrel connecting bar 17 is provided with a respective channel 15, which extends from an opening 12 provided on the blowing mandrel connecting bar 17 and opens out into the cylindrical recess 9, so that a fluid can be conducted from the opening 12 to the cylindrical recess 9. For its part, each blowing mandrel 3 has a channel 16, which connects two diametrically opposed points of the groove 10 of the blowing mandrel 3 to each other through the blowing mandrel 3. In this way, the temperature of the blowing mandrels 13—and alternatively also the supporting bar 4 and the blowing mandrel connecting bar 17—can be controlled by a fluid circulation in the system of channels described. In the case of the opening 11, the supporting bar 4 or its system of channels can be connected to a vessel for catching the fluid leaving the injection device 1.

The blowing mandrel connecting bar 17 and the fluid connecting bar 18 can be joined onto each other, can be fastened on each other by means of screws (not represented) led through smooth bores 21 in the blowing mandrel connecting bar 17 and fixedly screwed in threaded bores 22 of the fluid connecting bar 18, and can be released from each other by loosening and removing these screws.

The blowing mandrel connecting bar 17 and the fluid connecting bar 18 have channels which are described in more detail further below. In the joined-together holding bar 5, i.e. with the blowing mandrel connecting bar 17 and the fluid connecting bar 18 fastened on each other, these channels communicate with one another: they thereby form a system of channels, an opening 12 on the blowing mandrel connecting bar 17 and a corresponding opening 23 provided on the fluid connecting bar 18 being congruent in each case. Leading from the openings 23 in the fluid connecting bar 18 is a network of channels 25, which come together to form a collecting channel 24. The collecting channel 24 extends from an opening 26 provided on the fluid connecting bar 18, so that in the joined-together holding bar 5 a fluid can be conducted from the opening 26 to the cylindrical recess 9, in order to make possible the fluid circulation for controlling the temperature of the blowing mandrels 3. In the case of the opening 26, the holding bar 5 or its system of channels can be connected to a source of the fluid to be introduced into the injection device 1.

In the fluid connecting bar 18, the channels 25, including the collecting channel 24, are formed as grooves which are provided on the body 19 of the fluid connecting bar 18 for example by means of milling and are covered over by the cover 20. This produces the system of channels in the fluid connecting bar 18 when joining together the body 19 and the cover 20, which can be fastened on each other by means of screws (not represented) led through smooth bores 27 in the cover 20 and fixedly screwed in threaded bores 28 of the body 19, and can be released from each other by loosening and removing these screws.

Also provided in the cover 20 is a sealing groove 29, into which a seal (not represented) can be inserted in order to seal the fluid connecting bar 18, i.e. the cover 20 and the body 19 with respect to each other.

Figure 6:
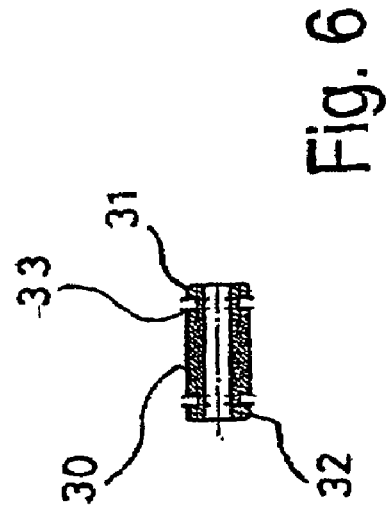
FIG. 6 shows an identical connecting piece as in FIG. 2c, partly in axial longitudinal section.

The blowing mandrels 3 are likewise sealed with respect to the supporting bar 4 and the holding bar 5 or (as part thereof) the blowing mandrel connecting bar 17. Provided for this purpose are connecting pieces 30 in the form of cylindrical sleeves (cf. FIGS. 2*c* and 6), which, with the supporting bar 4 and the holding bar 5 fastened on each other, are inserted in pairs therein, in the region of a blowing mandrel 3. One of the connecting pieces 30 is inserted by its one end 31 into the channel 13 provided in the supporting bar 4 and by its other end 32 into the channel 16 provided in the blowing mandrel 3, and the other connecting piece 30 is inserted by its one end 31 into the channel 15 provided in the holding bar 5 and by its other end 32 into the channel 16 provided in the blowing mandrel 3, the two connecting pieces 30 lying diametrically opposite each other in the blowing mandrel 3. Through their cavity, the connecting pieces 30 in the form of cylindrical sleeves connect the channels 13 and 16 or 15 and 16, into which they are inserted, in order to make possible the fluid circulation for controlling the temperature of the blowing mandrels 3. For its sealing with respect to the blowing mandrel 3 and the blowing mandrel holder 2, i.e. the supporting bar 4 or the holding bar 5, the connecting piece 30 in the form of a cylindrical sleeve has on the outside in the vicinity of each of its ends 31 and 32 a sealing groove 33 intended for receiving a sealing ring (not represented). The two connecting pieces 30 inserted into a blowing mandrel 3 consequently seal the fluid circulation with respect to a gap forming between the blowing mandrel 3 and the supporting bar 4 or the holding bar 5, and they hold the blowing mandrel 3 fixedly on the blowing mandrel holder 2.

The engagement of the two connecting pieces 30 at their one end 31 in the channel 13 or 15 provided in the holding bar 5 and at their other end 32 in the channel 16 provided in the blowing mandrel 3 has the effect that the blowing mandrel 3 is positioned fixedly and precisely with respect to the blowing mandrel holder designated as a whole by 2, with the consequence that the blowing mandrel 3 cannot slip on the blowing mandrel holder 2, because the two connecting pieces 30 in the blowing mandrel 3 lie diametrically opposite each other and consequently transversely in relation to the longitudinal axis of the blowing mandrel 3. In other words, the two connecting pieces 30 act on the blowing mandrel 3 like pins which hold it fixedly in its longitudinal direction on the blowing mandrel holder 2.

LIST OF REFERENCE NUMERALS

1 injection device as a whole
2 blowing mandrel holder as a whole
3 blowing mandrel
4 supporting bar
5 holding bar
6 screws
7 half-cylindrical recess in the supporting bar 4
8 half-cylindrical recess in the blowing mandrel connecting bar 17
9 cylindrical recess of the blowing mandrel holder 2
10 groove on the blowing mandrel 3
11 opening on the supporting bar 4
12 opening on the blowing mandrel connecting bar 17
13 channel in the supporting bar 4
14 collecting channel in the supporting bar 4
15 channel in the blowing mandrel connecting bar 17
16 channel in the blowing mandrel 3
17 blowing mandrel connecting bar
18 fluid connecting bar 19 body of the fluid connecting bar 18
20 cover of the fluid connecting bar 18
21 bore in the blowing mandrel connecting bar 17
22 threaded bore in the fluid connecting bar 18
23 opening on the fluid connecting bar 18
24 collecting channel in the fluid connecting bar 18
25 channel in the fluid connecting bar 18
26 opening on the fluid connecting bar 18
27 bore in the cover 20 of the fluid connecting bar 18
28 threaded bore in the body 19 of the fluid connecting bar 18
29 sealing groove in the cover 20 of the fluid connecting bar 18
30 connecting piece
31 end of the connecting piece 30
32 end of the connecting piece 30
sealing groove 33 in the vicinity of the end of the connecting piece 30

The invention claimed is:

1. An injection device used for example for blow molding hollow plastic bodies, comprising temperature-controllable blowing mandrels inserted in a blowing mandrel holder, the blowing mandrel holder having cylindrical recesses, in each of which a blowing mandrel is fixedly held, and the blowing mandrel holder and the blowing mandrels having respective channels, which communicate with one another in twos, in order to make possible a fluid circulation for controlling the temperature of the blowing mandrels, characterized by a two-part design of the blowing mandrel holder with a supporting bar and a holding bar, which can be joined onto each other and fastened and can be released from each other and each have an identical number of half-cylindrical recesses, which complement one another in the blowing mandrel holder to form cylindrical recesses, in each of which a blowing mandrel can be inserted when the supporting bar and the holding bar are released from each other and is fixedly held when the supporting bar and the holding bar are fastened on each other, and by connecting pieces in the form of cylindrical sleeves, which seal the fluid circulation with respect to a gap forming between the blowing mandrel and the supporting bar or the holding bar and also hold the blowing mandrel fixedly on the blowing mandrel holder.

2. The injection device as claimed in claim 1, characterized in that, with the supporting bar and the holding bar fastened on each other, the connecting pieces in the form of cylindrical sleeves are inserted by their one end into one of the channels provided in the supporting bar and the holding bar and by their other end into one of the channels provided in a blowing mandrel, and thereby connect said channels to one another respectively in twos.

3. The injection device as claimed in claim 1, characterized in that a connecting piece has on the outside in the vicinity of each of its ends a sealing groove intended for receiving a sealing ring.

4. An injection device used for example for blow molding hollow plastic bodies, comprising temperature-controllable blowing mandrels inserted in a blowing mandrel holder, the blowing mandrel holder having cylindrical recesses, in each of which a blowing mandrel is fixedly held, and the blowing mandrel holder and the blowing mandrels having respective channels which communicate with one another in twos, in order to make possible a fluid circulation for controlling the temperature of the blowing mandrels, characterized by a two-part design of the blowing mandrel holder with a supporting bar and a holding bar, which can be joined onto each other and fastened and can be released from each other and each have an identical number of half-cylindrical recesses, which complement one another in the blowing mandrel holder to form cylindrical recesses, in each of which a blowing mandrel can be inserted when the supporting bar and the holding bar are released from each other and is fixedly held when the supporting bar and the holding bar are fastened on each other, and by connecting pieces in the form of cylindrical sleeves, which seal the fluid circulation with respect to a gap forming between the blowing mandrel and the supporting bar or the holding bar and also hold the blowing mandrel fixedly on the blowing mandrel holder and further comprising a two-part design of the holding bar with a blowing mandrel connecting bar and a fluid connecting bar provided with an opening, which can be joined onto each other and fastened and can be released from each other and have respective channels, which communicate with one another in the holding bar in order to make possible a passage of the fluid circulation from the opening provided on the fluid connecting bar to and through the channels arranged in the supporting bar and in the blowing mandrels up to an opening provided on the supporting bar.

5. An injection device used for example for blow molding hollow plastic bodies, comprising temperature-controllable blowing mandrels inserted in a blowing mandrel holder, the blowing mandrel holder having cylindrical recesses, in each of which a blowing mandrel is fixedly held, and the blowing mandrel holder and the blowing mandrels having respective channels which communicate with one another in twos, in order to make possible a fluid circulation for controlling the temperature of the blowing mandrels, characterized by a two-part design of the blowing mandrel holder with a supporting bar and a holding bar, which can be joined onto each other and fastened and can be released from each other and each have an identical number of half-cylindrical recesses, which complement one another in the blowing mandrel holder to form cylindrical recesses, in each of which a blowing mandrel can be inserted when the supporting bar and the holding bar are released from each other and is fixedly held when the supporting bar and the holding bar are fastened on each other, and by connecting pieces in the form of cylindrical sleeves, which seal the fluid circulation with respect to a gap forming between the blowing mandrel and the supporting bar or the holding bar and also hold the blowing mandrel fixedly on the blowing mandrel holder and further comprising a two-part design of the fluid connecting bar with a body having channels and a cover, which can be joined onto each other and fastened and can be released from each other, the channels being formed as grooves which are provided on the body and covered over by the cover and the opening provided on the fluid connecting bar being arranged on the cover.

6. The injection device as claimed in claim 1 wherein the connecting pieces comprise two cylindrical sleeves for each of the mandrels and wherein, when the supporting bar and the holding bar are fastened together and fixedly holding the mandrels, for each of the mandrels, one of the sleeves extends across a gap formed between the mandrel and the supporting bar and the other sleeve extends across a gap formed between the mandrel and the holding bar.

7. The injection device as claimed in claim 6 wherein, for each respective mandrel, the two cylindrical sleeves fixedly hold the mandrel, extend transversely with respect to a longitudinal axis of the mandrel and are positioned diametrically opposite one another.

* * * * *